US006557881B2

United States Patent
Kortesalmi

(10) Patent No.: US 6,557,881 B2
(45) Date of Patent: May 6, 2003

(54) APPARATUS FOR TRANSPORTING OF A WORKING MACHINE

(76) Inventor: Ossi Kortesalmi, Metsolantie 6 B 14, FIN-95410 Kiviranta (FI)

( * ) Notice: Subject to any disclaimer, the term of this patent is extended or adjusted under 35 U.S.C. 154(b) by 0 days.

(21) Appl. No.: 10/057,633

(22) Filed: Oct. 25, 2001

(65) Prior Publication Data

US 2002/0066604 A1 Jun. 6, 2002

Related U.S. Application Data

(63) Continuation of application No. 09/403,173, filed as application No. PCT/FI98/00337 on Apr. 16, 1998, now abandoned.

(30) Foreign Application Priority Data

Apr. 18, 1997 (FI) .................................................. 971652

(51) Int. Cl.⁷ .............................................. B62D 53/04
(52) U.S. Cl. ...................................... 280/402; 414/469
(58) Field of Search ................................. 280/402, 400, 280/418.1, 47.131, 205; 414/469, 537, 373

(56) References Cited

U.S. PATENT DOCUMENTS

| | | | | |
|---|---|---|---|---|
| 1,844,818 A | * | 1/1932 | Gattie | 188/109 |
| 2,735,253 A | * | 2/1956 | Huddle | 180/14.1 |
| 2,943,863 A | * | 7/1960 | Corey et al. | 280/35 |
| 3,169,650 A | * | 2/1965 | Soyland | 280/402 |
| 3,333,718 A | * | 8/1967 | Durham | 280/418.1 |
| 3,338,440 A | * | 8/1967 | Donahue | 414/430 |
| 3,656,780 A | * | 4/1972 | Nordstrom | 280/418.1 |
| 4,673,328 A | * | 6/1987 | Shiels | 254/10 R |
| 4,846,484 A | * | 7/1989 | Nekola | 280/43 |
| 5,215,425 A | * | 6/1993 | Hambright | 280/402 |
| 5,358,266 A | * | 10/1994 | Roth et al. | 188/2 F |

FOREIGN PATENT DOCUMENTS

GB 1044074 * 9/1966

* cited by examiner

Primary Examiner—Lesley D. Morris
Assistant Examiner—Paul Royal, Jr.
(74) Attorney, Agent, or Firm—Alix, Yale & Ristas, LLP

(57) ABSTRACT

An apparatus for transporting a working machine, e.g., an excavating machine, movable on crawler tracks and being provided with an excavating mechanism. The apparatus includes at least two spaced-apart wheels and a load platform mounted therebetween. The working machine is secured at one end to the load platform and at the other end props against a tractor vehicle via the excavating mechanism. The working machine may be driven onto the load platform where its advancement is stopped by a guard on the load platform. As the working machine moves into contact with the guard, the mass of the working machine delivers to the load platform a moment that forces the load platform to pivot against the bottom surface of a crawler track. At least one gripping element on the load platform eliminates relative slippage between the crawler track and the load platform and locks the working machine against the guard. One such apparatus is provided for each track of the working machine.

10 Claims, 5 Drawing Sheets

APPARATUS FOR TRANSPORTING OF A WORKING MACHINE

CROSS REFERENCE TO RELATED APPLICATION

This application is a continuation of U.S. application Ser. No. 09/403,173, filed Dec. 17, 1999, now abandoned, which was the National Stage of International Application No. PCT/FI98/00337, filed Apr. 16, 1998.

BACKGROUND OF THE INVENTION

1. Field of the Invention

The present invention relates to an apparatus for transfer rides of a working machine, especially an excavating machine, movable on crawler tracks and provided with an excavating mechanism or some other lifting means, said apparatus comprising at least two spaced-apart wheels and a load platform mounted therebetween, the working machine being adapted to be hoisted at one end thereof to rest on the apparatus and to be secured to the load platform as well as at the other end to prop against a tractor vehicle through the intermediary of the excavating mechanism or other lifting means of the working machine.

2. Description of the Related Art

The working machines operating on crawler tracks are generally very slow and, thus, even relatively short-distance transfers of such machines are preferably covered by using separate carriages or wheel systems mounted on the working machine. Such a latter type of apparatus is prior known e.g. from GB Patent publication 1,044,074.

In the apparatus disclosed in GB Patent publication 1,044,074, a working machine is secured to a wheel system, wherefor the chassis of the working machine must be fitted with separate coupling elements, which may result in major costs. The prior known apparatus involves drawbacks in terms of its use as well. The use is inconvenient and slow, as it requires special measures and, in addition, the working machine operator must step out of the cab of a working machine for locking the wheel system in place or, respectively, for releasing the wheel system.

SUMMARY OF THE INVENTION

An object of the invention is to provide an apparatus, which is simply and quickly attachable to a working machine and which apparatus does not necessitate any modifications to the working machine.

According to the invention, this object has been achieved and an apparatus of the invention is characterized in that a working machine is adapted to be driven onto a load platform, said load platform being provided with a guard for stopping the advancement of the working machine at a desired spot on the load platform and said guard being fitted in such a manner that, as the working machine is in contact with the guard, the mass of said working machine delivers to the load platform a moment that forces the load platform to pivot against the bottom surface of a crawler track of the working machine, and that the load platform is provided for each crawler track with at least one gripping element for eliminating a relative slippage between the crawler track and the load platform and for locking the working machine against the guard.

When using an apparatus of the invention, a working machine can be brought very quickly to a transfer condition and respectively to an operating condition without forcing the driver to step out of the cab. Neither is it necessary for the driver of a tractor vehicle to step out of his or her vehicle since, when transferring an excavating machine, for example, it is sufficient that the bucket of the excavating machine be propped against the platform of the tractor vehicle.

BRIEF DESCRIPTION OF THE DRAWINGS

The invention will now be described in more detail with reference made to the accompanying drawings, in which.

DETAILED DESCRIPTION OF THE PREFERRED EMBODIMENT

Figure 1:
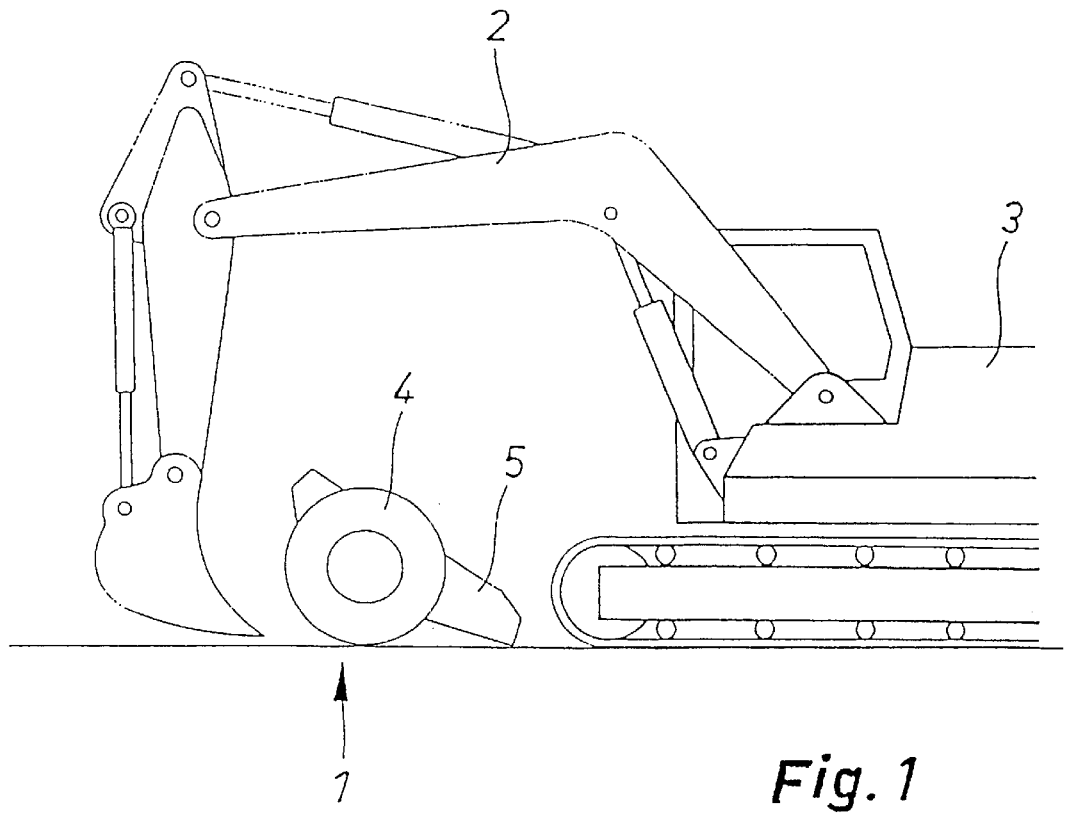
FIG. 1 is a side view, showing an apparatus of the invention in a condition, wherein the apparatus is ready to receive a working machine to be driven onto the same.
Figure 2:
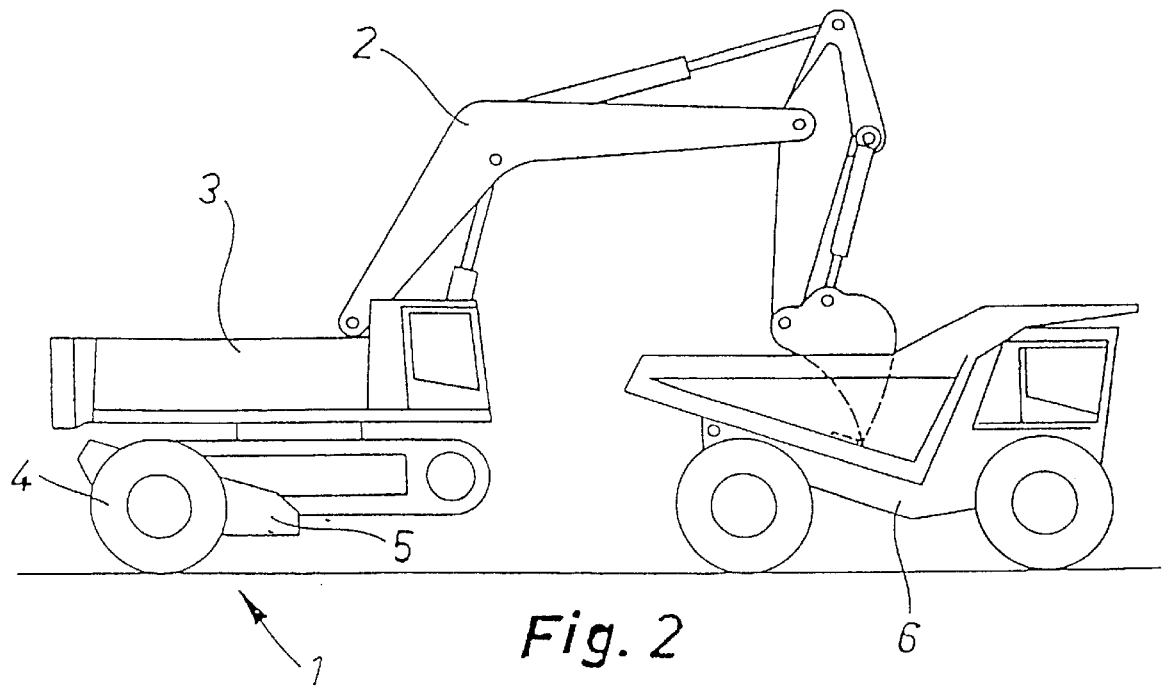
FIG. 2 shows a working machine in a transfer condition, propped on the one hand against an apparatus of the invention and on the other hand against a tractor vehicle through the intermediary of the bucket of the working machine.

The apparatus, designated generally in the drawings with reference numeral 1, is intended for transfer rides of a working machine 3, especially an excavating machine, movable on crawler tracks and provided with an excavating mechanism 2 or some other lifting means.

Referring now to FIGS. 1–7, the apparatus 1 includes at least two spaced-apart wheels 4 mounted for a free rotation and a load platform 5 fitted therebetween.

The load platform 5 comprises a trough-like carrier, the floor of which is constituted by a number of spaced-apart beams 12 which are welded at the ends thereof securely to sheets that make up side walls 10 for the load platform 5, to which is in turn securely welded a plate-like rear wall and/or a beam 13 connecting the side walls 10 together at the upper portions thereof in the rear of the load platform 5.

The wheels 4 are mounted in a per se known manner on the side walls 10 of the load platform 5. The point of attachment is selected such that, as a result of gravity, the load platform 5 has its leading edge always pressing against the ground or floor, whenever the apparatus 1 stands freely in an unloaded condition on the ground (FIG. 1), the working machine 3 being drivable onto the load platform 5 in such a manner that one end of the working machine will rest on the load platform 5.

Figure 5:
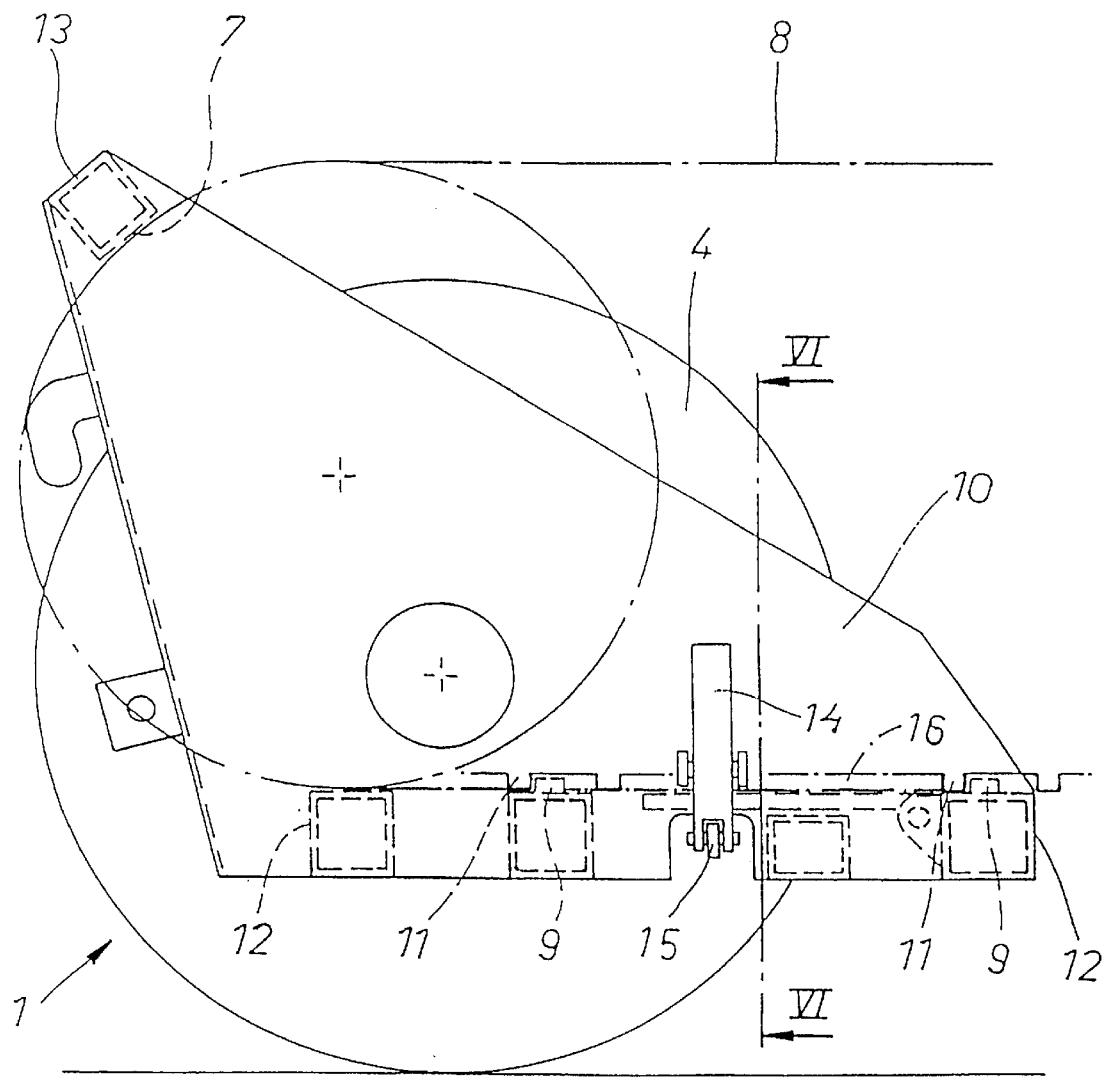
FIG. 5 shows an apparatus of the invention in a side view and partially sectioned, the section along a line V—V in FIG. 6.

The load platform 5 is provided with a mechanical guard 7, which in the example of FIG. 5 comprises a beam 13, for stopping the advancement of the working machine 3 at a desired spot on the load platform 5. The guard 7 is fitted in such a way that, when a working machine is in contact with the guard 7, the mass of the working machine 3 delivers to the load platform 5 a moment which forces the load platform 5 to pivot against the outer surface of a crawler track 8 of the working machine 3.

The load platform 5 has a bearing surface which is provided for each crawler track 8 with at least one gripping element 9 for eliminating a relative slippage between the crawler track 8 and the load platform 5 and for locking the working machine 3 against the guard 7. In the example of FIG. 5, the gripping element 9 included in the load platform 5 is constituted by a protrusion, sticking out of the bearing surface of the load platform 5 and designed to match a respective gripping element 11 included in the crawler track 8. Naturally, the gripping element 9 may also be constituted by a recess, in which the respective gripping element of the crawler track takes hold of and prevents a relative slippage between the crawler track 8 and the load platform 5.

Figure 3:
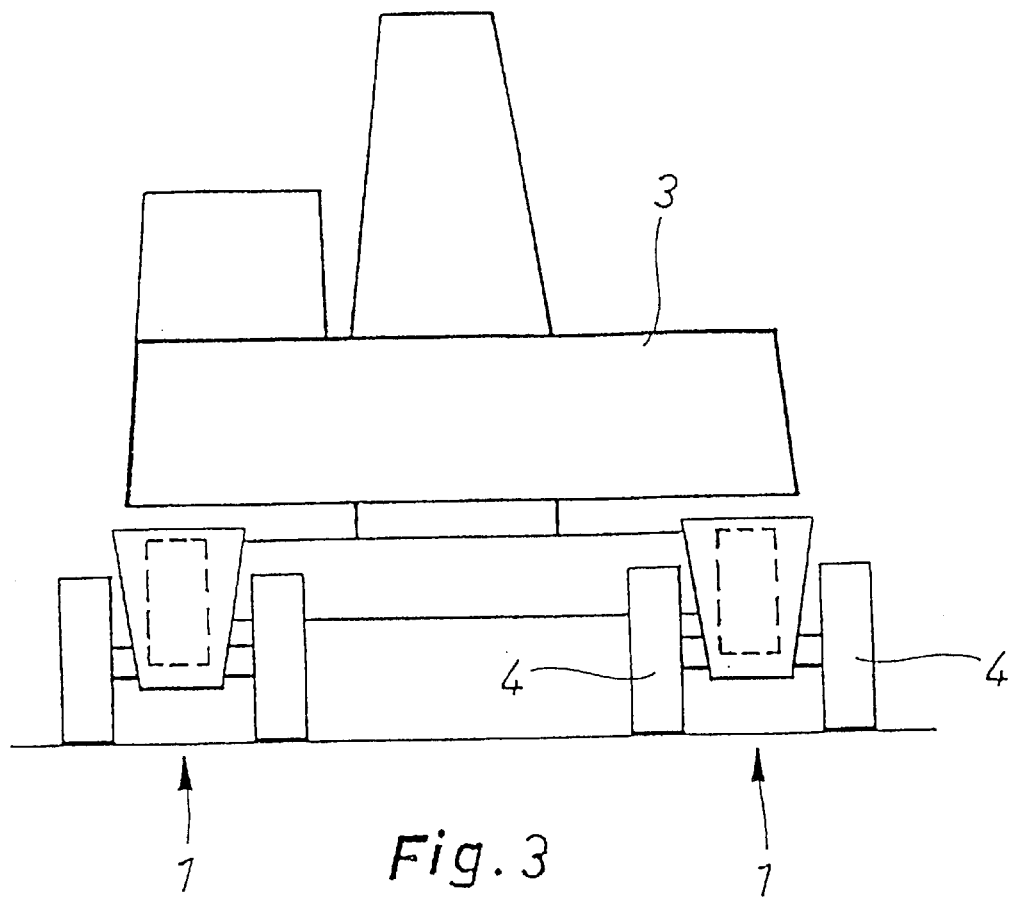
FIG. 3 shows from behind an apparatus according to a first embodiment of the invention, with a working machine in a transfer condition.
Figure 4:
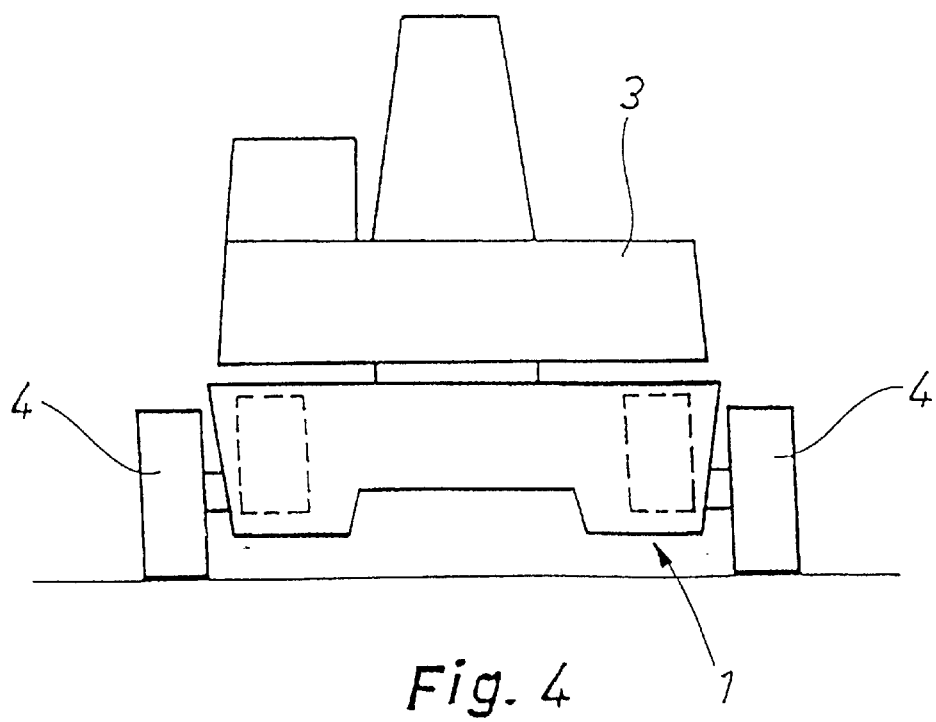
FIG. 4 shows from behind an apparatus according to a second embodiment of the invention, with a working machine in a transfer condition.

Depending on the weight and size of the transferable working machine 3, the apparatus 1 of the invention can be designed as depicted in FIG. 4, with both crawler tracks 8 of the working machine 3 propped on the same apparatus 1. Especially when dealing with heavy-duty working machines 3, the exemplary embodiment shown in FIG. 3 is more preferable, with each crawler track 8 provided with its own apparatus 1. In this case, both pieces of apparatus 1 are designed as independent units, separated from each other and only coupled together by the working machine 3 itself. In order to prevent a toe-out or toe-in from developing between the wheels 4 of the separate pieces of apparatus 1, the load platforms 5 have an internal width which is dimensioned to be just slightly more than the width of the crawler track 8, whereby the load platform 5 always sets itself substantially in alignment with the crawler track 8.

In the solution of FIG. 3, which uses two pieces of apparatus 1, the side walls 10 of the load platform 5 are adapted to diverge from each other when progressing upwards from the bearing surface of the load platform 5. Thus, the apparatus 1 is freely inclinable when performing transfers on uneven terrains.

In one preferred embodiment of the invention, the apparatus 1 is fitted with wheels 4 which lock automatically upon the removal of a load off the load platform 5. Such a brake mechanism secures the immobilization of the apparatus 1 also on an inclined surface, thus facilitating the use of the apparatus 1.

Figure 6:
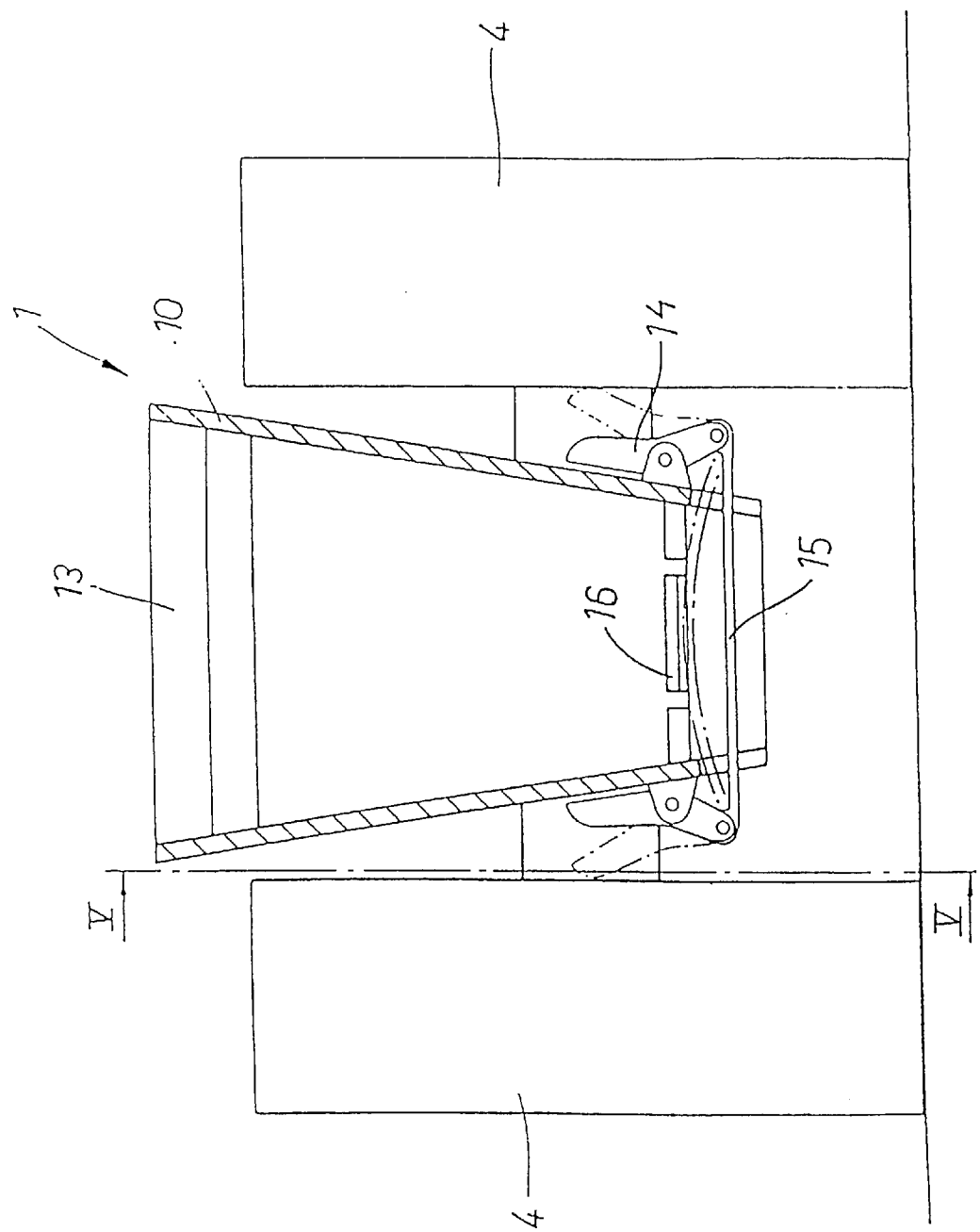
FIG. 6 shows a section along a line VI—VI in FIG. 5.
Figure 7:
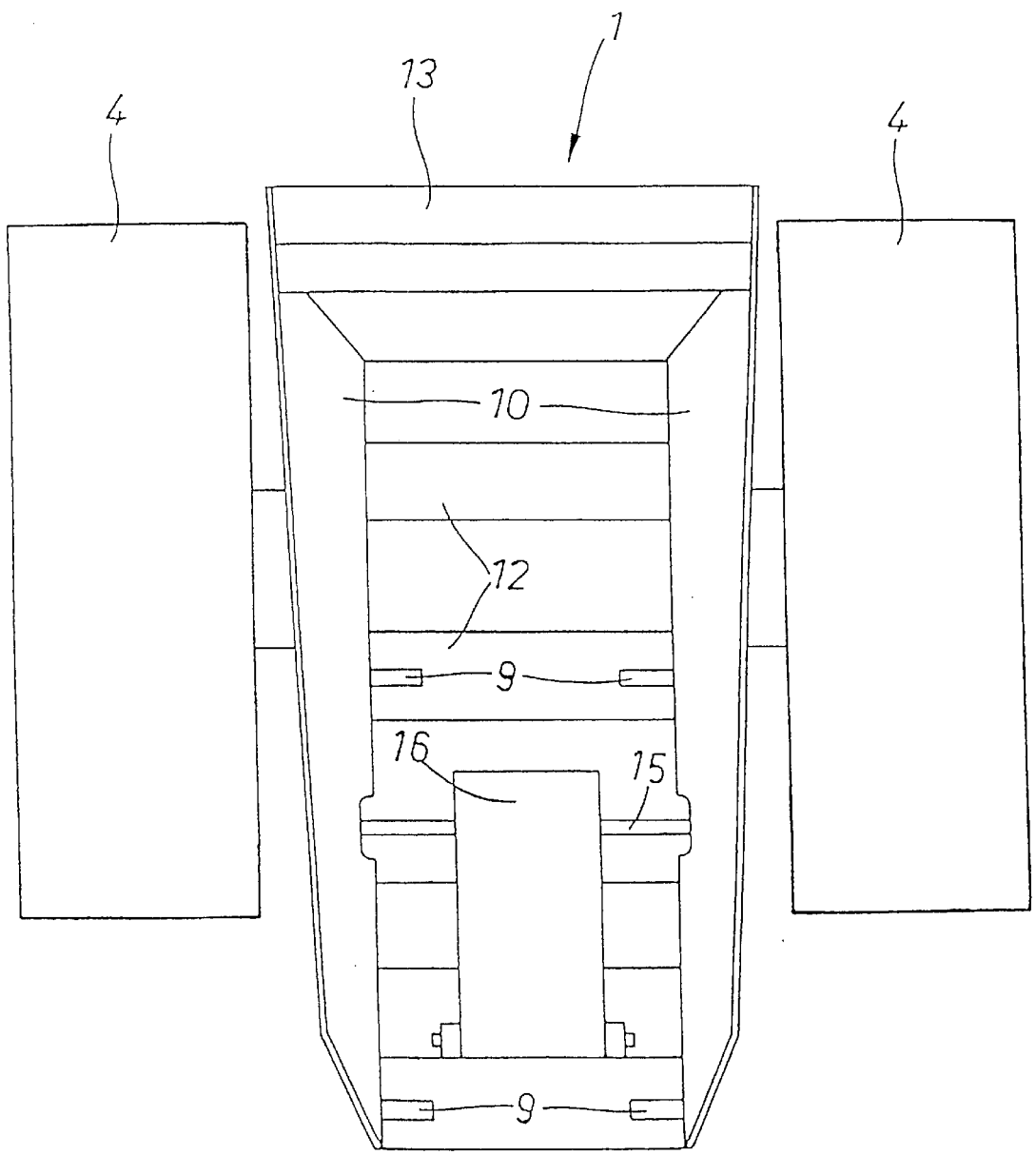
FIG. 7 shows an apparatus according to the first embodiment of the invention in a plan view.

In the exemplay embodiment shown in FIGS. 5-7, the brake mechanism comprises a lever 14 articulated in the middle to the external surface of a side wall of the load platform 5. One of the legs, the bottom one, of the lever 14 is pivotably fitted with a plate spring 15 or the like. In an unloaded condition, the plate spring 15 is in the position depicted with dash-and-dot lines in FIG. 6, the other, upper leg of the lever 14 leaning against the wheel 4 and blocking its rotation. In order to bend the spring 15, the load platform 5 is provided with a member 16, pivotably journalled at its leading edge and pressed down by the crawler track 8 and, respectively, lifted up by the spring 15 whenever the member 16 is not subjected to pressure from the crawler track 8.

The apparatus of the invention operates as follows.

In the first condition shown in FIG. 1, the working machine 3 is driven up to rest on one or two pieces of apparatus 1 all the way until the crawler track 8 collides with the permanent guard 7 included in the apparatus 1. Thereafter, the track 8 may still slightly slip relative to the load platform 5 until said track grabs the gripping element 9. At this point, the apparatus 1 and the working machine 3 are completely locked to each other.

Following this, the excavating mechanism 2 of the working machine 3 is turned from the position of FIG. 1 through 180° around the vertical axis, thus bringing the excavating mechanism 2 onto the load bed of the tractor vehicle 6 and lifting the crawler tracks 8 of the working machine 3 off the ground by means of the excavating mechanism 2, whereafter the working machine 3 is ready for a transfer.

If necessary, the working machine 3 can be used for braking action by adjusting the excavating mechanism 2 in such a way that the crawler tracks 8 touch the ground at the leading end of the working machine 3.

What is claimed is:

1. A combination of an apparatus for transfer of a working machine and a working machine, the working machine provided with a lifting means and movable on crawler tracks having a bottom surface, said apparatus comprising:

at least two spaced-apart wheels and a load platform mounted therebetween, the load platform being configured to receive and secure one end of the working machine thereon while the other end of the working machine is supportable by a towing vehicle through the intermediary of the lifting means of the working machine and wherein the load platform is adapted to receive only one of said crawler tracks of the working machine as the working machine is driven thereon, a guard interconnected with said load platform for stopping the advancement of the working machine at a desired spot on the loading platform and said guard being fitted in such a manner that, as the crawler track contacts the guard, the mass of the working machine delivers to the load platform a moment that forces the load platform to pivot against the bottom surface of the crawler track of the working machine;

wherein one separate said apparatus is provided for each crawler track, wherein each said apparatus is provided with at least one gripping element for eliminating a relative slippage between each said crawler track and the load platform and for locking the working machine against the guard, and wherein the load platform comprises side walls which are adapted to diverge from each other away from a bearing surface of the load platform.

2. The combination as set forth in claim 1, wherein the wheels lock automatically upon the removal of a load from the load platform.

3. The combination as set forth in claim 1, wherein the gripping element comprises a protrusion sticking out of the bearing surface of the load platform or, respectively, a recess extending below the bearing surface, either of said protrusion or said recess being configured to mate with a complementary gripping element located on the crawler track.

4. The combination of claim 1, wherein the working machine comprises an excavating machine having two crawler tracks and wherein the towing vehicle comprises a tractor vehicle.

5. The combination of claim 1, wherein the lifting means comprises an excavating mechanism.

6. A combination of a working machine and an apparatus for transporting the working machine, the working machine being of the type equipped with a lifting means and having crawler tracks with a bottom surface, said apparatus comprising:

at least two spaced apart wheels;

a load platform mounted between said wheels, said load platform having a bearing surface configured to receive and secure a first end of one said crawler track;

a guard connected to the load platform such that when the working machine is driven onto the load platform, said first end contacts the guard and a moment is generated forcing the load platform to pivot such that the bearing surface of the load platform engages the bottom surface of the crawler track;

at least one gripping element for eliminating a relative slippage between the crawler track and the load platform and said gripping element locking said first end against the guard; and side walls extending from the load platform and being adapted to diverge from each other in a direction toward the working machine, wherein there is provided a separate said apparatus for each crawler track of the working machine.

7. The combination of claim 6, wherein the working machine comprises an excavating machine having two crawler tracks.

8. The combination of claim 7, wherein the lifting means comprises an excavating mechanism.

9. The combination of claim 6, wherein the wheels automatically lock upon the removal of a working machine from the load platform.

10. The combination of claim 6, wherein the gripping element comprises a protrusion extending from the bearing surface of the load platform or a recess disposed in the bearing surface, either of said protrusion or said recess being configured to mate with another gripping element located on the crawler track.

\* \* \* \* \*